United States Patent [19]
Duck et al.

[11] Patent Number: 6,040,932
[45] Date of Patent: Mar. 21, 2000

[54] METHOD AND CIRCUIT FOR DEMULTIPLEXING AN OPTICAL SIGNAL

[76] Inventors: Gary S. Duck, 6 Barcham Crescent, Nepean, Ontario, Canada, K2J 3Z7; Koichi Abé, 60 Robert Street, Ottawa, Ontario, Canada, K2P 1G4; Joseph Ip, 57 Drainic Drive, Kanata, Ontario, Canada, K2C 3J7; Mark Farries, 26 Tiverton, Drive, Nepean, Ontario, Canada, K2E 6L5; Paul Colbourne, 45D Woodfield Drive, Nepean, Ontario, Canada, K2G 3Y6

[21] Appl. No.: 08/864,895

[22] Filed: May 29, 1997

[30] Foreign Application Priority Data

Apr. 25, 1997 [CA] Canada .................................. 2203729

[51] Int. Cl.[7] .................................................. H04J 14/02
[52] U.S. Cl. ........................... 359/124; 359/124; 359/127; 359/129; 359/130
[58] Field of Search ..................... 359/127, 130, 359/124, 129

[56] References Cited

U.S. PATENT DOCUMENTS

| | | | |
|---|---|---|---|
| 5,748,350 | 5/1998 | Pan et al. ............................... | 359/130 |
| 5,751,456 | 5/1998 | Koonen ................................... | 359/127 |
| 5,786,915 | 7/1998 | Scobey ................................... | 359/127 |
| 5,841,918 | 11/1998 | Li ............................................ | 385/24 |
| 5,852,505 | 12/1998 | Li ............................................ | 359/118 |

*Primary Examiner*—Jason Chan
*Assistant Examiner*—Mohammad Sedighian
*Attorney, Agent, or Firm*—Neil Teitelbaum & Associates

[57] ABSTRACT

A system and method are disclosed for demulitplexing closely spaced channels carrying optically encoded data. A composite optical signal having data channels corresponding to center wavelengths $\lambda 1, \lambda 2, \lambda 3, \lambda 4, \ldots \lambda n$ are separated into two composite optical signals of first of which comprises data channels corresponding to center wavelengths $\lambda 1, \lambda 3, \ldots \lambda n$ and a second which comprises data channels corresponding to center wavelengths $\lambda 2, \lambda 4, \ldots \lambda n-1$, wherein adjacent channels center wavelengths are separated from one another by a distance "d". A periodic multi-cavity Fabry-Perôt etalon having a free spectral range of "2d" is coupled to a circulator for launching an input beam. The first of the two composite optical signals carrying channels 1, 3, . . . n is reflected from the input port of the etalon and the second of the of the two optical signals carrying channels 2, 4, . . . n−1 is transmitted through the etalon. After the two signals are separated, further separation can be achieved by using conventional dichroic filters.

18 Claims, 13 Drawing Sheets or

METHOD AND CIRCUIT FOR DEMULTIPLEXING AN OPTICAL SIGNAL

FIELD OF THE INVENTION

This invention relates generally to the field of demultiplexing and more particularly relates to the use of a device having a periodic response to input light of varying wavelengths for demultiplexing.

BACKGROUND OF THE INVENTION

Using optical signals as a means of carrying channeled information at high speeds through an optical path such as an optical waveguide i.e. optical fibers, is preferable over other schemes such as those using microwave links, coaxial cables, and twisted copper wires, since in the former, propagation loss is lower, and optical systems are immune to Electro-Magnetic Interference (EMI), and have higher channel capacities. High-speed optical systems have signaling rates of several mega-bits per second to several tens of giga-bits per second.

Optical communication systems are nearly ubiquitous in communication networks. The expression herein "Optical communication system" relates to any system that uses optical signals at any wavelength to convey information between two points through any optical path. Optical communication systems are described for example, in Gower, Ed. Optical communication Systems, (Prentice Hall, NY) 1993, and by P. E. Green, Jr in "Fiber optic networks" (Prentice Hall New Jersey) 1993, which are incorporated herein by reference.

As communication capacity is further increased to transmit an ever-increasing amount of information on optical fibers, data transmission rates increase and available bandwidth becomes a scarce resource.

High speed data signals are plural signals that are formed by the aggregation (or multiplexing) of several data streams to share a transmission medium for transmitting data to a distant location. Wavelength Division Multiplexing (WDM) is commonly used in optical communications systems as means to more efficiently use available resources. In WDM each high-speed data channel transmits its information at a pre-allocated wavelength on a single optical waveguide. At a receiver end, channels of different wavelengths are generally separated by narrow band filters and then detected or used for further processing. In practice, the number of channels that can be carried by a single optical waveguide in a WDM system is limited by crosstalk, narrow operating bandwidth of optical amplifiers and/or optical fiber non-linearities. Moreover such systems require an accurate band selection, stable tunable lasers or filters, and spectral purity that increase the cost of WDM systems and add to their complexity. This invention relates to a method and system for filtering or separating closely spaced channels that would otherwise not be suitably filtered by conventional optical filters.

Currently, internationally agreed upon channel spacing for high-speed optical transmission systems, is 100 Ghz, equivalent to 0.8 nm, surpassing, for example 200 Ghz channel spacing equivalent to 1.6 nanometers between adjacent channels. Of course, as the separation in wavelength between adjacent channels decreases, the requirement for more precise demultiplexing circuitry capable of ultra-narrow-band filtering, absent crosstalk, increases. The use of conventional dichroic filters to separate channels spaced by 0.4 nm or less without crosstalk, is not practicable; such filters being difficult if not impossible to manufacture.

It is an object of this invention to provide a method and circuit for separating an optical signal having closely spaced channels into at least two optical signals wherein channel spacing between adjacent channels is greater in each of the at least two optical signals, thereby requiring less precise filters to demultiplex channels carried by each of the at least two signals.

SUMMARY OF THE INVENTION

In accordance with this invention, an optical device having a periodic response, for example, to "white-light", or a broad range of wavelengths of light, is utilized to separate an input beam into a reflected beam and a transmitted beam, each of the two beams being approximately half as dense, in the number of channels comprised therein, as the input beam.

Preferably, the optical device is in the form of a Fabry-Perôt etalon, having a periodic response coincident with or related to every second or alternate channel in a channeled optical system, for example wherein the period is coincident with channels 1, 3, and 5 or alternatively with channels 2, 4, and 6. Hence, the optical circuit shown and described hereafter, in accordance with this invention, performs a de-interleaving function (demultiplexing) or an interleaving function (multiplexing).

In accordance with another aspect of the invention, there is provided, in a system wherein a plurality of contiguous channels comprising a plurality of non-contiguous channels 1, . . . n centered at wavelengths of light $\lambda 1$, . . . $\lambda n$, respectively, multiplexed within a single optical signal, wherein the signal comprises at least a channel spaced from a subsequent or next channel by a distance of "d" nanometers, and wherein $\lambda$. . . $<\lambda n$, and wherein n is an integer, a method of demultiplexing channels of light corresponding to at least some non-contiguous channels from the single optical signal, comprising the steps of:

launching the single optical signal into an input port of an etalon, the etalon having a free spectral range (or period) corresponding to substantially "k2d", where "k" is an integer >0;

extracting a portion of the launched optical signal in the form of a reflected signal captured from an input port side of the etalon comprising at least some channels spaced by a distance "2d".

In accordance with invention, there is further provided, in a system wherein a plurality of contiguous channels 1, 2, 3, . . . n centered at wavelengths of light $\lambda 1$, $\lambda 2$, $\lambda 3$, . . . $\lambda n$, respectively, multiplexed within a single optical signal, wherein at least a channel comprising the signal is spaced from a subsequent or next channel by a distance of "d" nanometers, and wherein $\lambda 1 < \lambda 2 < \lambda 3$, . . . $<\lambda n$, and wherein n is an integer, a method of demultiplexing channels of light corresponding to at least channels 1 and 3 from the single optical signal, comprising the steps of:

launching the single optical signal into an input port of an etalon, the etalon having a free spectral range (or period) corresponding to "2d";

extracting a portion of the launched optical signal in the form of a reflected signal captured from an input port side of the etalon comprising at least two first extracted channels, spaced by a distance "2d".

In accordance with the invention there is provided a system for demultiplexing an optical signal into at least two optical signals comprising:

A plurality of multi-cavity Fabry-Perôt etalons each having a substantially same free spectral range, and at least two of the etalons having wavelength responses that are shifted from one another by 180 degrees.

In accordance with the invention, there is further provided, a system for demultiplexing a plurality of contiguous channels 1, 2, 3, . . . n centered at wavelengths of light λ1, λ2, λ3, . . . λn, respectively, multiplexed within a single optical signal, wherein at least a channel within the signal has a center wavelength is spaced from a center wavelength of a subsequent or next channel by a distance of "d" nanometers, and wherein λ1<λ2<λ3, . . . <λn, and wherein n is an integer, the system comprising:

a multi-cavity first etalon having a free spectral range (or period) corresponding to "2d";

an input port for launching the signal comprising the plurality of channels; coupling means optically coupled with the input port and the multi-cavity first etalon, said coupling means for providing the signal to the etalon, and for receiving a portion of the signal reflected from the multi-cavity first etalon.

The invention in its simplest form, given three adjacent channels, provides a means, preferably in the form of a multi-cavity Fabry-Perôt etalon, of sending the middle-most channel along a first path and two side adjacent channels along another path.

BRIEF DESCRIPTION OF THE DRAWINGS

Exemplary embodiments of the invention will now be described in conjunction with the drawings, in which.

DETAILED DESCRIPTION

Figure 1A:
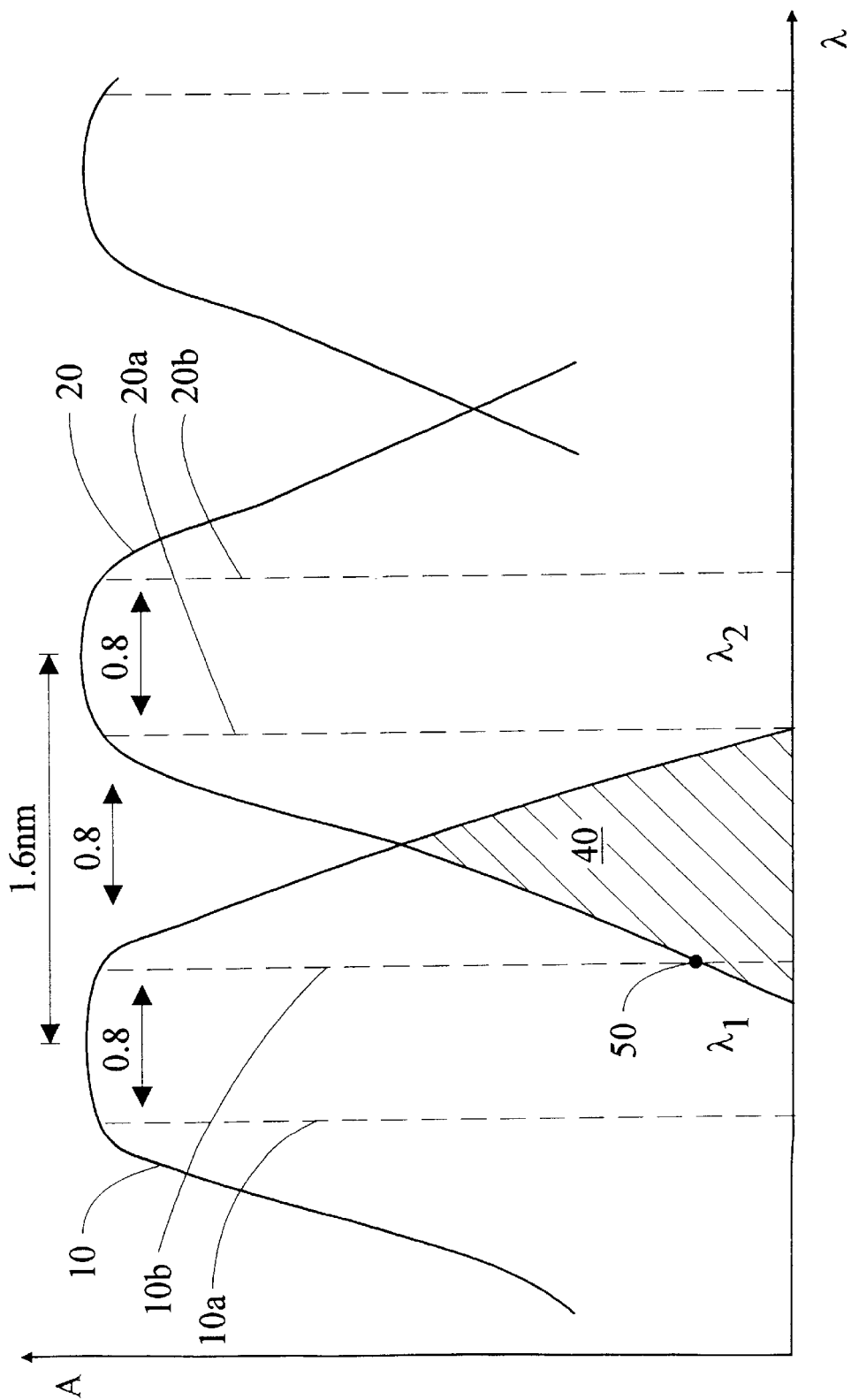
FIG. 1 is a graph of an output response for two dichroic multi-layer filters centered at two wavelengths in a 200 Ghz system.

Referring now to FIG. 1, wavelength responses 10 and 20 for two filters designed to pass two adjacent channels centered at λ1 and λ2 respectively, are shown. The filters designed to operate with a 200 Ghz optical system, wherein the distance between center wavelengths of adjacent channels is 1.6 nm. The filter's responses 10 and 20 are shown to have boundaries indicated by dashed lines within which each laser providing a data signal for each channel may operate. Thus, for example, a laser that operates to provide the optical data signal of channel 1, corresponding to filter response 10, must operate between wavelengths corresponding to lines 10a and 10b, and in a same manner the laser that provides the optical signal for channel 2, must operate to provide an optical data signal that has a wavelength that is between the dashed lines 20a and 20b.

In order for the optical system to operate so that the integrity of the data is preserved, crosstalk between adjacent channels must be minimized and must at least be below a predetermined allowable maximum level (−20 dB). In FIG. 1, the response of filter 20 is shown to overlap with the response of filter 10, the overlap region indicated by the cross-hatched triangular region 40. Furthermore, the dashed line 10b is shown to intersect the sloped line indicating the response of the filter 10, at a point 50. Thus, if the distance (or channel spacing) between dashed lines 10b and 20a was lessened, i.e. in order to have a more dense communication system by increasing the number of total channels for a given bandwidth, cross talk between adjacent channels would exceed allowable maximum level (−20 dB) using the filters shown.

When 100 Ghz channel spacing equivalent to 0.8 nm is implemented, the filters depicted by the output responses 10 and 20 do not adequately separate channels 1 and 2 and high levels of crosstalk adversely affect data retrieval. In this instance, conventional dichroic filters as shown in FIG. 1, would not suffice and crosstalk would exceed allowable maximum levels.

In accordance with this invention, a method is provided of first demultiplexing a channeled optical signal, that is, a signal comprising multiplexed closely spaced channels, into a plurality of less-dense channeled signals each comprising a plurality of multiplexed less closely spaced channels.

Figure 2:
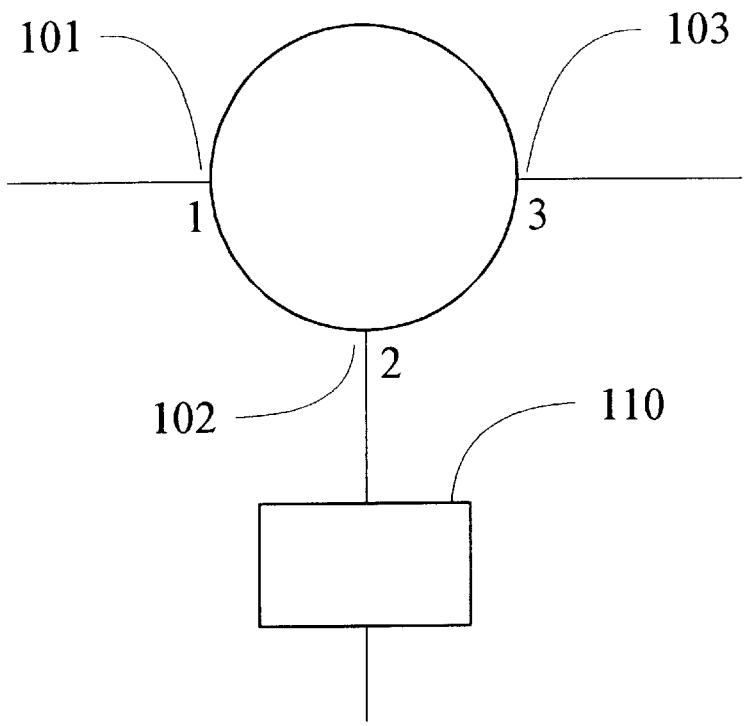
FIG. 2 is a circuit diagram of a demultiplexor in accordance with the invention.
Figure 4A:
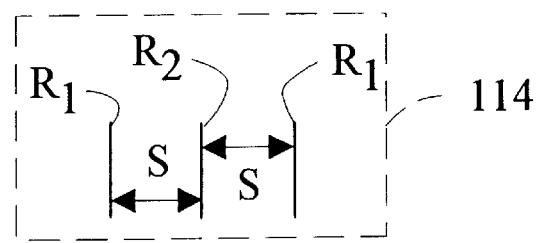
FIG. 4a is a diagram of the etalon depicted in FIG. 4.
Figure 5A:
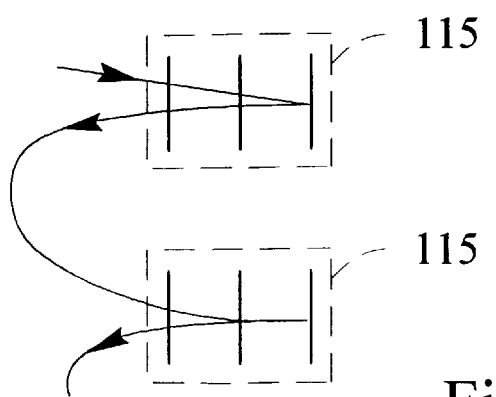
FIG. 5a is a diagram of the etalon depicted in FIG. 5.

Referring now to FIG. 2, an optical circuit is shown including a 3-port optical circulator having an input port 101, its second port 102 coupled with a Fabry-Perôt etalon filter 110, and a third port 103 serving as an output port. The Fabry-Perôt etalon filter 110 has two partially reflective mirrors, or surfaces, facing each other and separated by a certain fixed gap which forms a cavity.

In general, the spectral characteristics of an etalon filter are determined by the reflectivity and gap spacing of the mirrors or reflective surfaces. The Fabry-Perôt principle allows a wideband optical beam to be filtered whereby only periodic spectral passbands are substantially transmitted out of the filter. Conversely, if the reflectivity of the mirrors or reflective surfaces are selected appropriately, periodic spectral passbands shifted by d nanometers are substantially reflected backwards from the input mirror surface. In adjustable Fabry-Perôt devices, such as one disclosed in U.S. Pat. No. 5,283,845 in the name of Ip, assigned to JDS Fitel Inc, tuning of the center wavelength of the spectral passband is achieved typically by varying the effective cavity length (spacing).

Figure 3A:
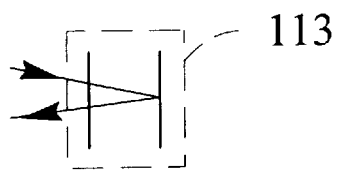
FIG. 3a is a diagram of the etalon depicted in FIG. 3.
Figure 3:
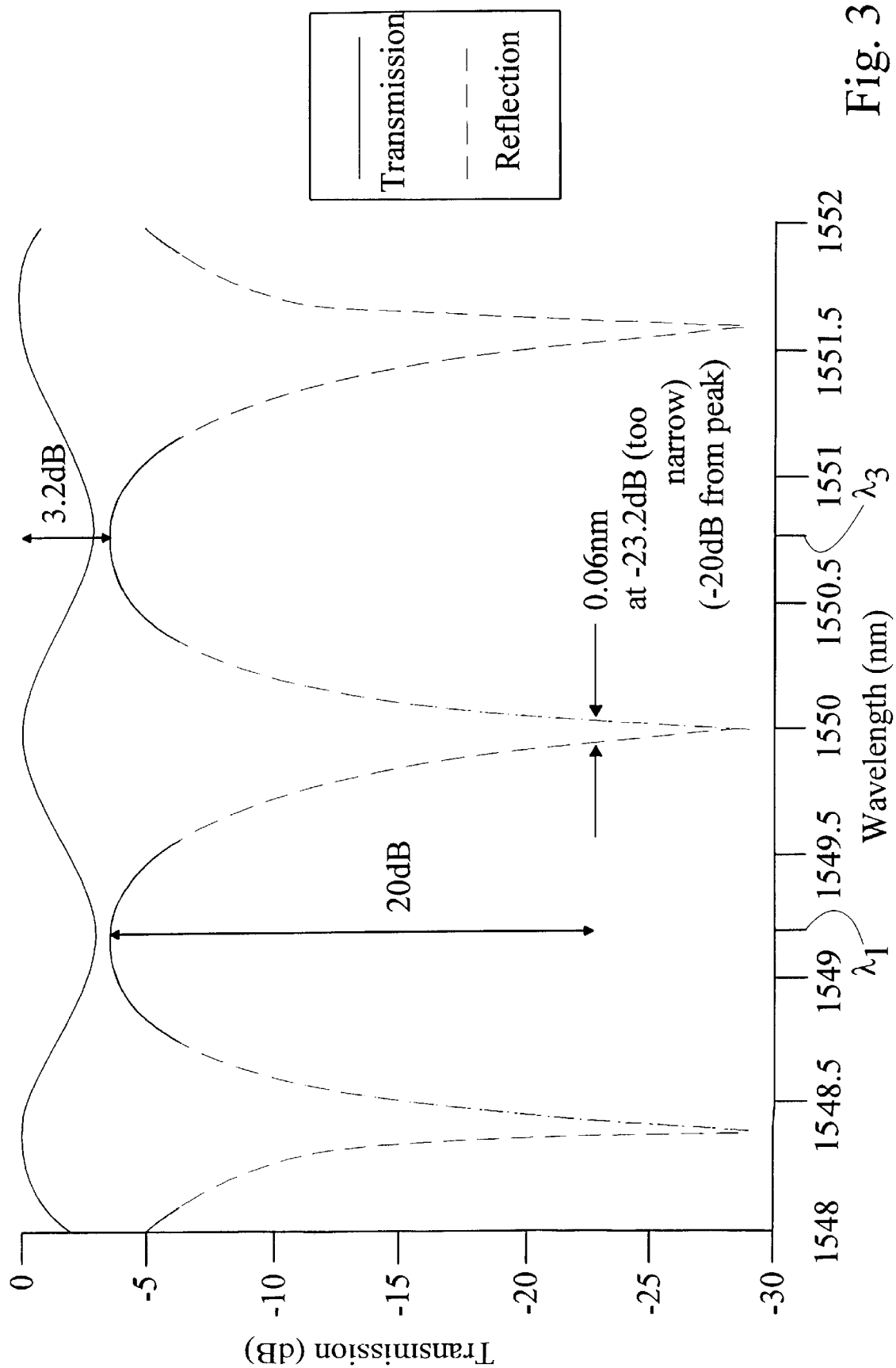
FIG. 3 is a graph of an output response for a single etalon showing transmission and reflection versus wavelength.

Referring now to FIGS. 3, 4, 5, 6, 7, and 3a, 4a, 5a, 6a, and 7a output response curves of five different Fabry-Perôt etalon devices 113, 114, 115, 116, and 117 in accordance with this invention, are described, in order of their performance, from least to most optimal. FIG. 3 shows an output response curve for a 2-mirror etalon having an FSR of 1.6 nm and a finesse of 1.5. A first curve shown as a solid line is a periodic transmission response in dBs for the single etalon 113 to input light ranging in wavelength from 1548 nm to 1552 nm. The second group of curves in the same figure, shown as dotted lines, depict the reflection response of same etalon 113 within the same wavelength range. It is noted that at the wavelengths $\lambda 1\sim 1549.2$ nm and $\lambda 3\sim 1550.85$ nm the intensity of the reflected light from the input light launched into the etalon is attenuated by approximately −3 dB. It is further noted that at the wavelengths $\lambda 2\sim 1550$ nm and $\lambda 4\sim 1551.6$ nm, essentially all of the input light launched into the etalon is transmitted through the 2 mirrors to the output port of the etalon 113. Since the etalon in accordance with a preferred embodiment of this invention is to be used to pass and reflect adjacent channels having a 0.4 nm bandwidth, it is preferred that the response of the etalon, in this instance, at the wavelengths $\lambda 2$ and $\lambda 4$, have a window of at least 0.4 nm where reflection does not exceed about −25 dB. Stated in more general terms, it is preferred that at wavelengths $\lambda 1$ and $\lambda 3$ most of the light incident upon the input port of the etalon is reflected backwards, and that most of the light at wavelengths $\lambda 2$ and $\lambda 4$ be transmitted through the etalon. However, as can be seen from the graph of FIG. 3, the transmission window at $\lambda 2$ or 1550 nm, is only 0.06 nm wide at −23 dB. At wavelengths $\lambda 1$ and $\lambda 3$, and within a 0.4 nm window, approximately half or more of the input light launched into the etalon is reflected indicated by the response curve at 3.2 dB. The periodicity of the etalon allows multiple wavelengths of light to be routed through the device and multiple other adjacent wavelengths to be reflected backwards, thereby separating the multiplexed channelized input light signal into two less dense optical signals.

Figure 4:
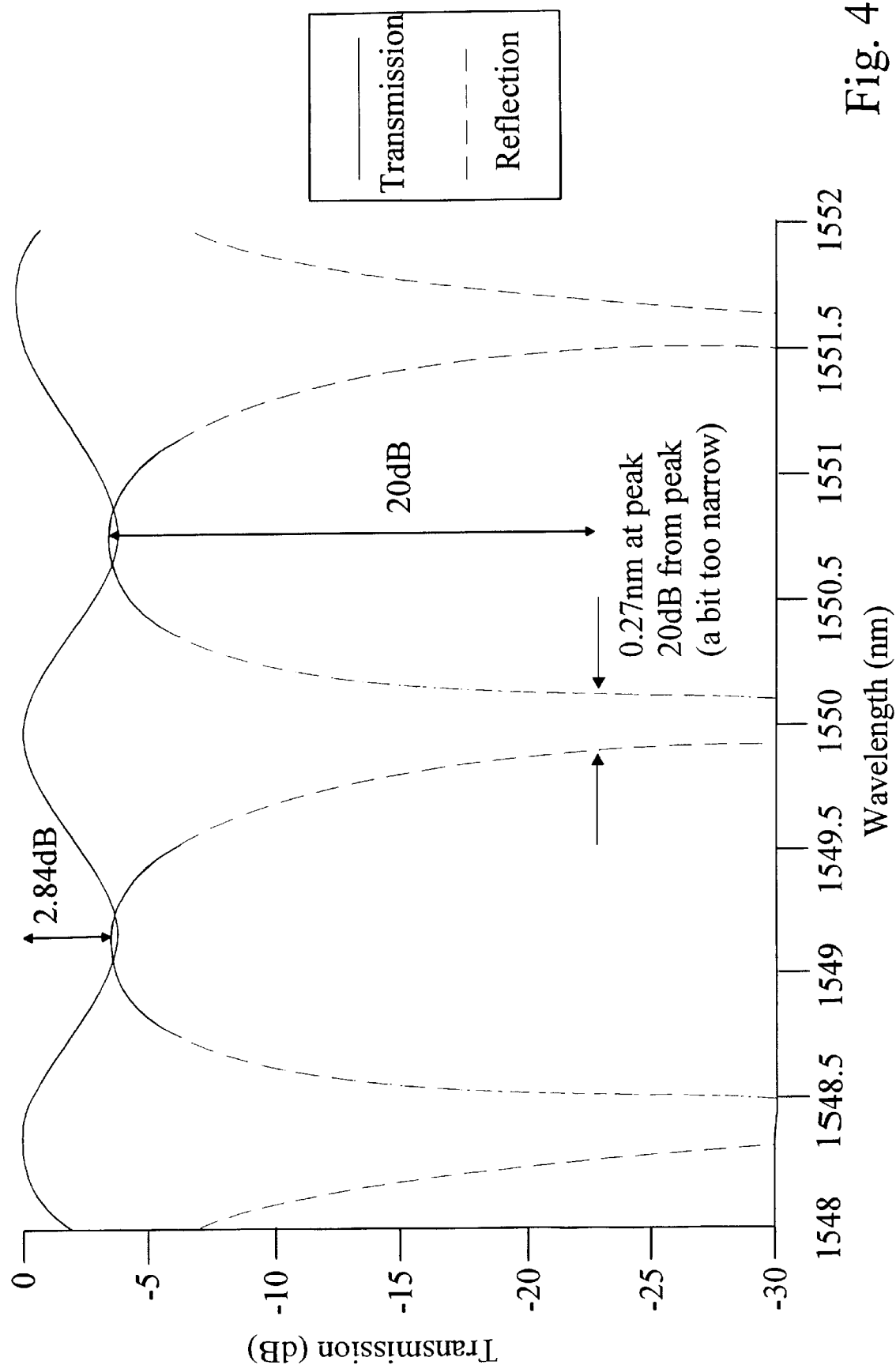
FIG. 4 is a graph of an output response for a single etalon showing transmission and reflection versus wavelength.

Referring now to FIG. 4, a response curve for a 3-mirror two-cavity etalon 114 is shown having an FSR of 1.6 nm and a reflectivity of R1=0.05 where R2=4R1/(1+R1)². The mirrors are arranged such that the mirror having a reflectivity R2 is sandwiched between and spaced a distance d from outer mirrors having a reflectivity R1. It is noted by the response curves for this device that at wavelengths $\lambda 1$ and $\lambda 3$, reflection is at −2.84 dB thereby indicating less attenuation of channels at these wavelengths than for the etalon 113. Furthermore, the transmission window at −23 dB for channels corresponding to wavelengths $\lambda 2$ and $\lambda 3$ is 0.27 nm, again an improvement over the response of single cavity etalon 113. Notwithstanding, the etalon 114 does not provide enough isolation between adjacent channels.

Figure 5:
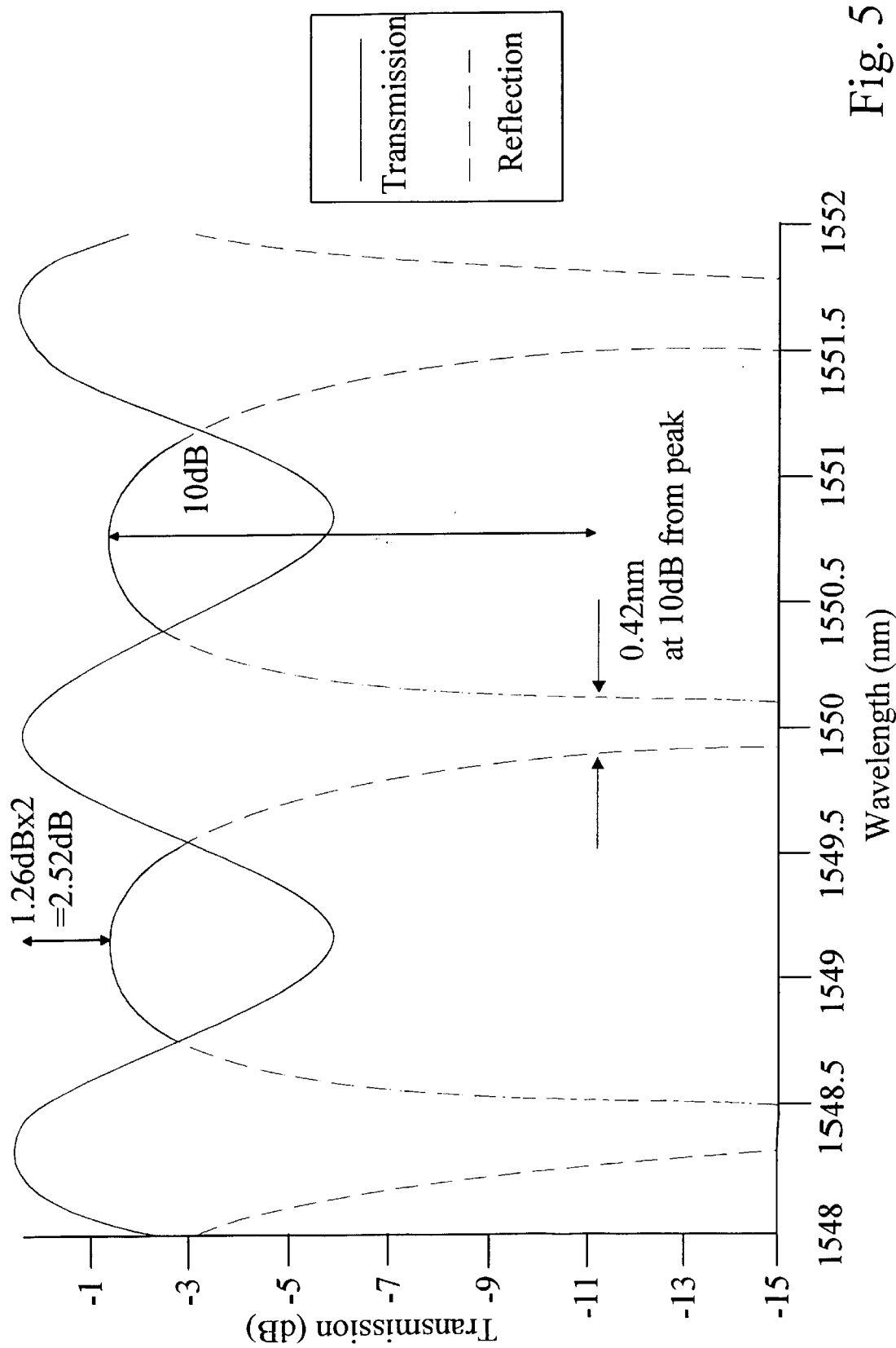
FIG. 5 is a graph of an output response for a single etalon showing transmission and reflection versus wavelength.

In FIG. 5, a response curve for 2 3-mirror two-cavity etalons 115 is shown in reflection mode; each etalon has an FSR of 1.6 nm and a reflectivity of R1=0.1. In this configuration light is launched into a first etalon 115 and signal reflected from the first etalon 115 is reflected again from the second etalon 115. The window is approximately 0.42 nm for each etalon at 10 dB from the peak for channels corresponding to wavelengths $\lambda 2$ and $\lambda 4$, thus providing a window of approximately 0.42 nm for rejection of $\lambda 2$ and $\lambda 4$ from the reflected signal for the double pass.

Figure 6:
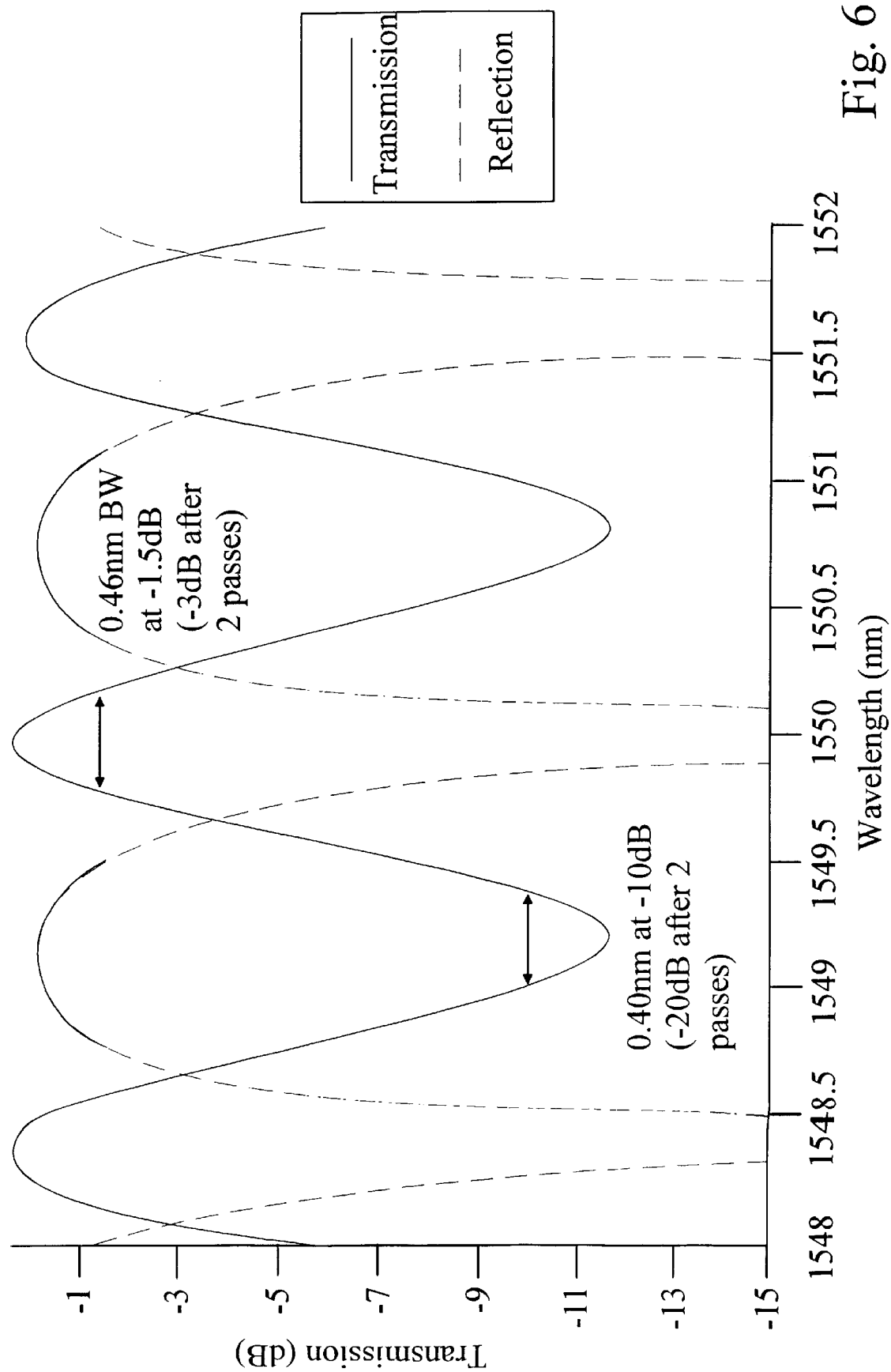
FIG. 6 is a graph of an output response for a single etalon showing transmission and reflection versus wavelength.

FIG. 6 shows a response curve for a 2-pass transmission system having two double-cavity etalons with R1=0.21. Here channels corresponding to wavelengths $\lambda 1$ and $\lambda 3$ are substantially blocked within a 0.4 nm window for each etalon 116 and nearly 100 percent transmission is provided for wavelengths $\lambda 2$ and $\lambda 4$, with acceptable levels of crosstalk from adjacent substantially blocked (reflected) wavelengths $\lambda 1$ and $\lambda 3$. For this configuration care must be taken to avoid multiple reflections between the two etalons 116, which would degrade the performance. This can be accomplished by passing the optical beam through 166 at a small angle, or by placing an optical isolator between the two etalons 116.

Figure 7:
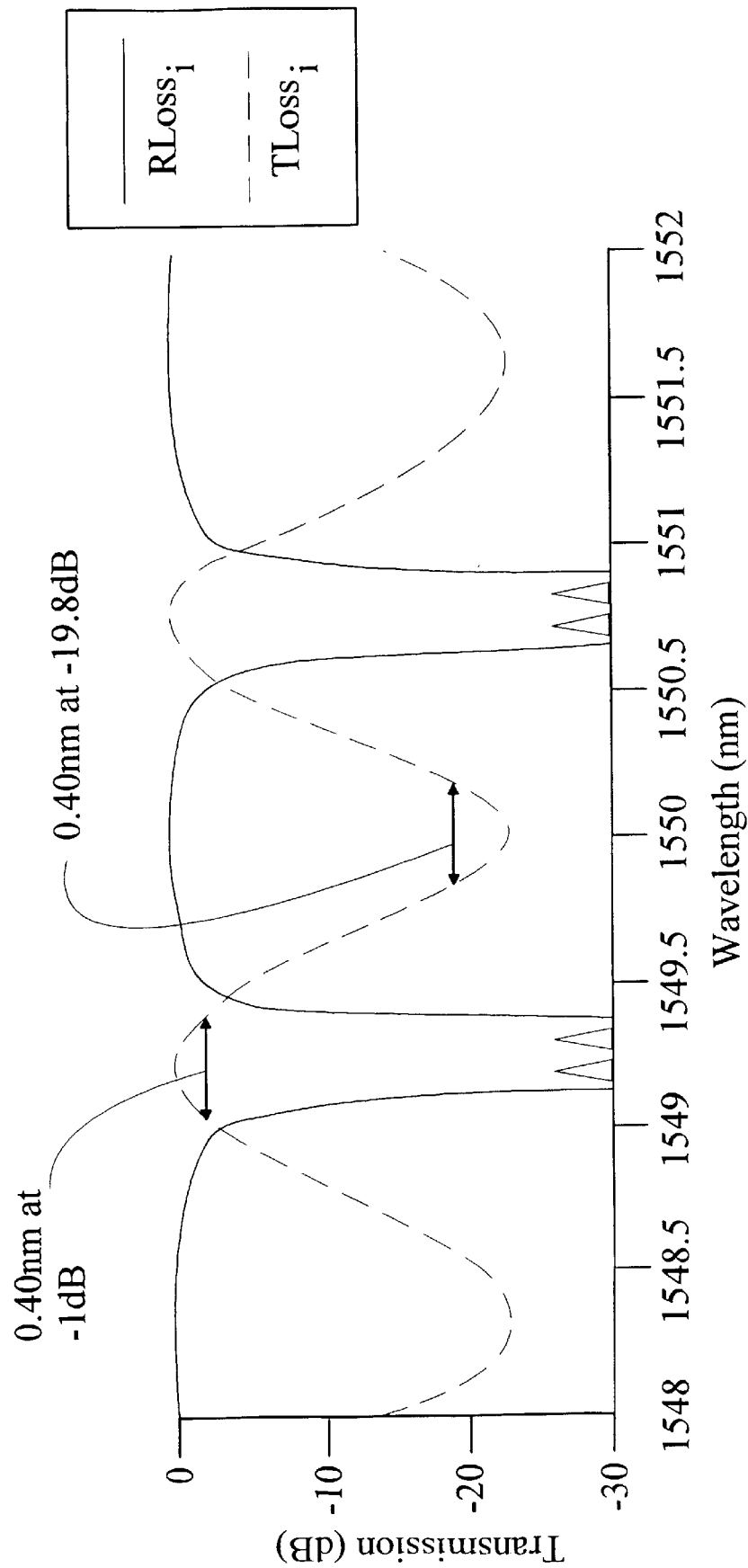
FIG. 7 is a graph of an output response for a single etalon showing transmission and reflection versus wavelength.
Figure 7A:
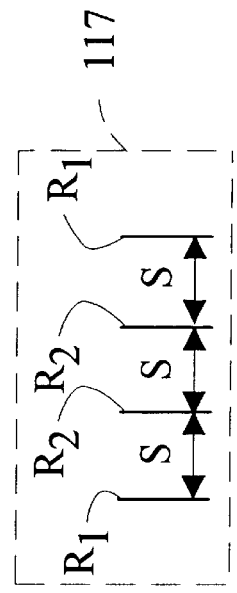
FIG. 7a is a diagram of the etalon depicted in FIG. 7.
Figure 6A:
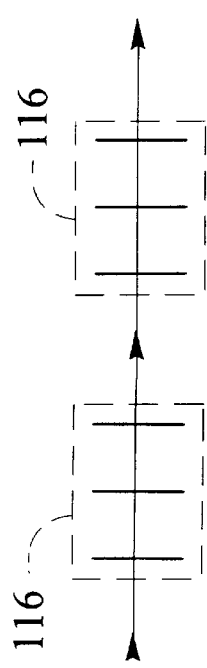
FIG. 6a is a diagram of the etalon depicted in FIG. 6.
Figure 7B:
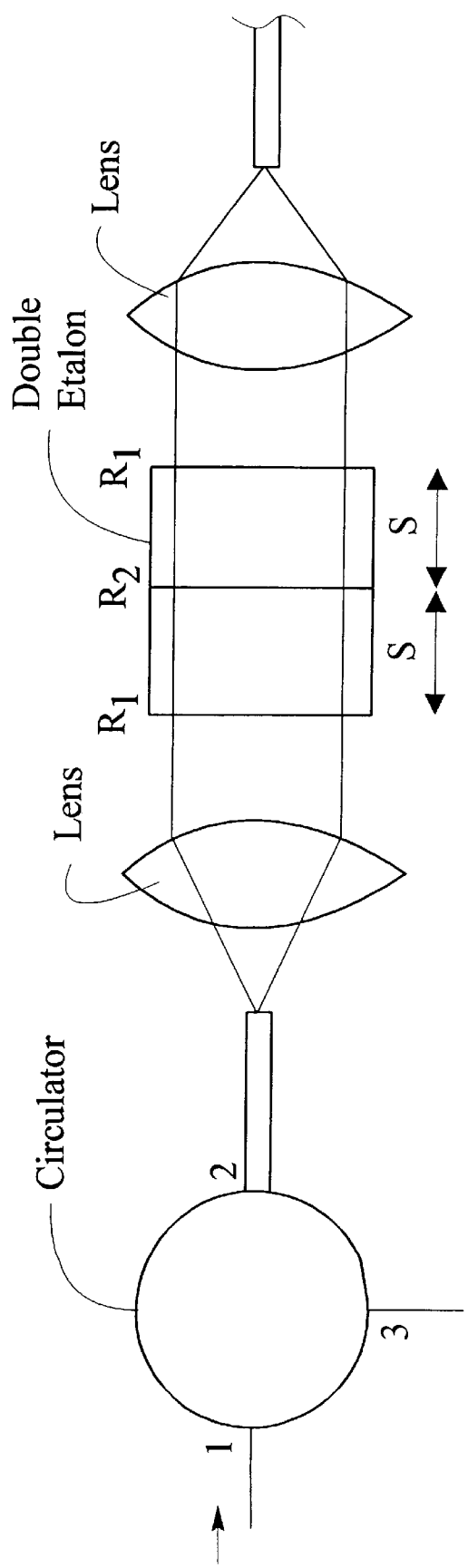
FIGS. 7b and 7c are more detailed diagrams of the devices in accordance with the invention.
Figure 7C:
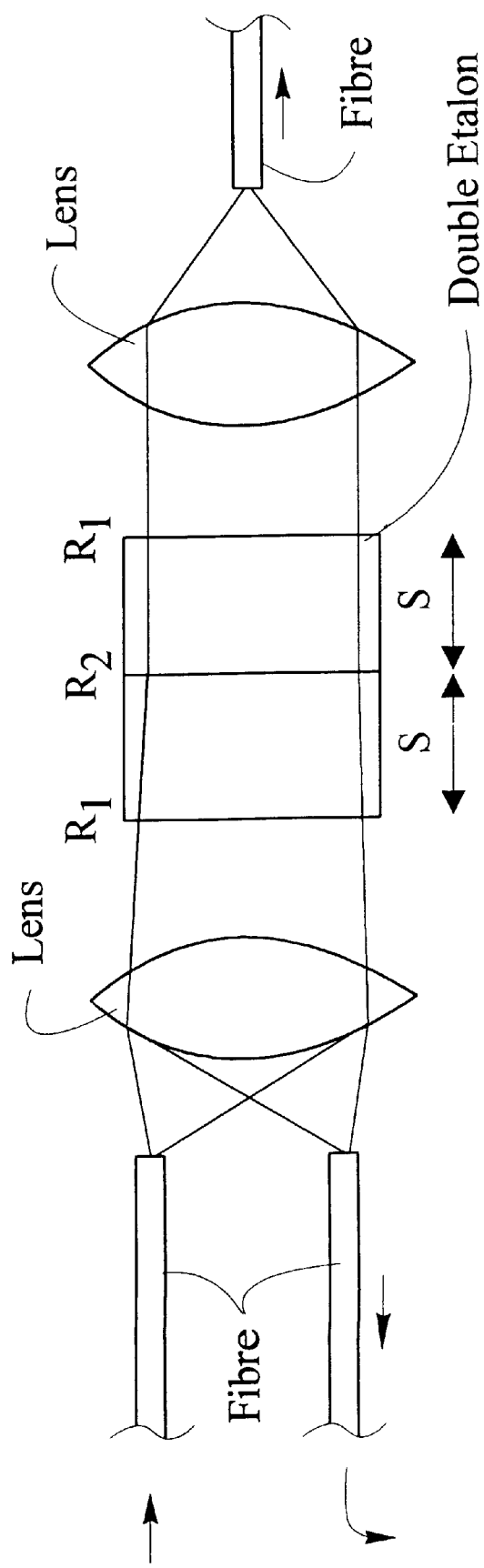

Turning now to FIG. 7 the response curves for an etalon 117 having 4 mirrors, wherein R1=0.2 and R2=0.656 spaced from each other by a distance s. In this embodiment having multi-cavity etalons defined by a 4-mirror configuration wherein R1=0.2, and R2=0.656, the response is yet improved over the previous etalon designs. In this instance, and as can be seen with reference to FIG. 7. Channels $\lambda 1$ and $\lambda 3$ are substantially blocked over a range of approximately 0.40 nm at −19.8 dB, and there is a transmission window of approximately 0.40 nm at −1 dB for channels $\lambda 2$ and $\lambda 4$. In reflection, channels $\lambda 1$ and $\lambda 3$ are almost completely reflected, and $\lambda 2$ and $\lambda 4$ are largely absent from the reflected signal, although additional filtering may be necessary to remove remaining levels of $\lambda 2$ and $\lambda 4$ from the reflected signal.

By providing multi-cavity etalon structures, the response is considerably improved over that of a single cavity etalon.

By using a device having a periodic response, such as the etalon 116 or 117, channels corresponding to wavelengths of light $\lambda 1, \lambda 3, \lambda 5, \ldots$ are substantially separated from adjacent closely spaced channels corresponding to wavelengths of light $\lambda 2, \lambda 4, \lambda 6, \ldots$ the latter corresponding to wavelengths or channels transmitted through the device, and the former corresponding to wavelengths or channels reflected from etalon backwards to the input port end of the device and into a waveguide attached thereto. The optical circuit shown in FIG. 2 shows an optical circulator as a means of coupling an optical signal having closely spaced channels into and out of a Fabry-Perôt etalon, however, other coupling means may be envisaged such as a 50/50 splitter, or separate fibers for input and reflected output. Essentially the means must allow light to be launched into the etalon, and for the light to be ported out of the etalon at its input port end via reflections backwards, or ported out of the etalon at its output port end via transmission through the etalon. Although the circuit in accordance with this invention is well suited to separating alternate channels from a sequence of closely spaced channels, into two optical signals for further filtering and processing, the circuit is also suited to separating any plurality of channels that are spaced by a predetermined distance or multiple thereof. For example in a system where sequentially spaced channels spaced by a distance from one another by 0.8 nm and wherein wavelengths of light $\lambda 1, \lambda 2, \lambda 5, \lambda 6, \lambda 7$ are multiplexed into a single optical signal corresponding to channels 1, 2, 5, 6, and 7, wavelengths $\lambda 1, \lambda 5$, and $\lambda 7$ are separated into a first optical signal, and a second optical signal comprises wavelengths $\lambda 2$ and $\lambda 6$ after being launched into the etalon 110, having a free spectral range of 1.6 nm. Since a portion of channels 1, 3, 5, and 7 are passed through the etalon with channels 2, 4, 6 and 8, further processing will be required to demultiplxed channels 2, 4, 6, and 8.

Figure 8:
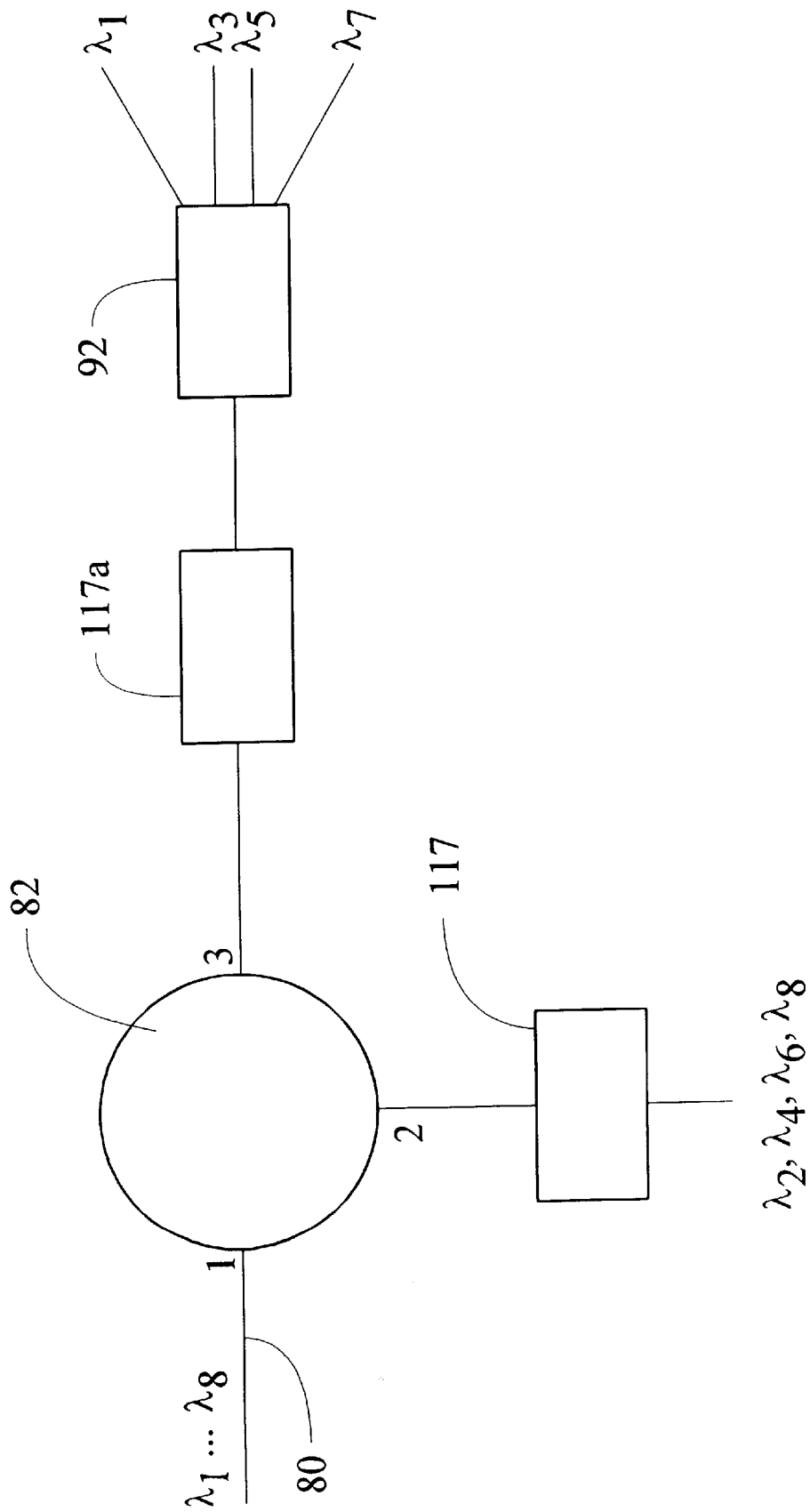
FIG. 8 is an optical circuit diagram of a sub-system for demultiplexing one high density channelized optical signal into two less dense optical signals.

Turning now to FIG. 8 in conjunction with the etalon shown in FIG. 3 or FIG. 4, a sub-system is shown, for demultiplexing a composite optical signal carrying channels 1, 2, 3, 4, . . . 8 into a first signal carrying channels 1, 3, 5, 7 and a second signal carrying channels 2, 4, 6, and 8. This sub-system may be a part of larger communications system. By way of example, and for the purpose of this description, the etalons for use in this system are those shown and described in FIG. 7. At a first end of the sub-system is an optical fibre 80 carrying the composite optical signal. An output end of the optical fibre 80 is coupled to an input port 1 of an optical circulator 82. Coupled to a next sequential circulating port 2 is a Fabry-Perôt etalon 117 in accordance with this invention as is described heretofore. An output port of the etalon 117 is coupled to conventional filter means 92 for separating channels 2, 4, 6, and 8. Port 3 of circulator 82 is connected to a second etalon 117a having a same FSR but its output response shifted by d to ensure that channels 2, 4, 6, and 8 are fully removed. Further conventional filter means in the form of a plurality of dichroic filters 92 are provided for separating channels 1, 3, 5, and 7.

The operation of the sub-system of FIG. 8 is as follows. A light beam comprising channels 1, 2, 3, ... 8 is launched into the optical fiber 80 and enters port 1 of the optical circulator 82 exiting port 2 toward the first Fabry Perot etalon 117 at port 2. Light reflected from 117 propagates to port 3 of circulator 82 and then is passed to etalon 117a and is demultiplexed further with conventional WDM devices 92 and can optionally be amplified. Etalon 117 essentially reflects all of wavelengths of light $\lambda 1$, $\lambda 3$, $\lambda 5$, and $\lambda 7$ and transmits virtually all of $\lambda 2$, $\lambda 4$, $\lambda 6$, and $\lambda 8$. However, the reflection from etalon 117 contains slightly higher than acceptable levels of light of wavelengths $\lambda 2$, $\lambda 4$, $\lambda 6$, and $\lambda 8$. A second etalon 117a is required to remove remaining levels of light of wavelengths $\lambda 2$, $\lambda 4$, $\lambda 6$, and $\lambda 8$, to avoid interference with the signals of wavelengths $\lambda 1$, $\lambda 3$, $\lambda 5$, and $\lambda 7$.

Figure 9:
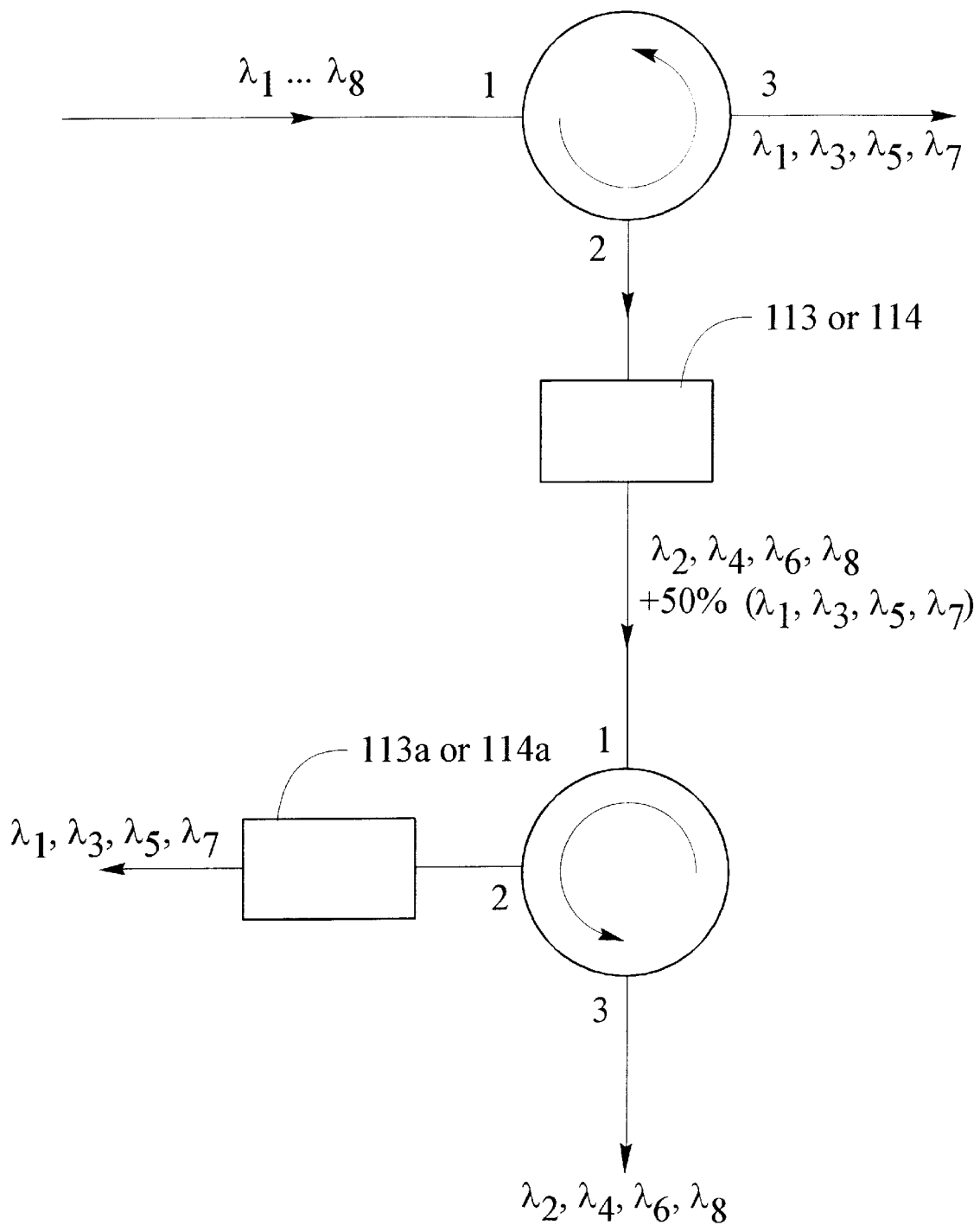
FIG. 9 is an optical circuit diagram of a system in accordance with the invention.
Figure 10:
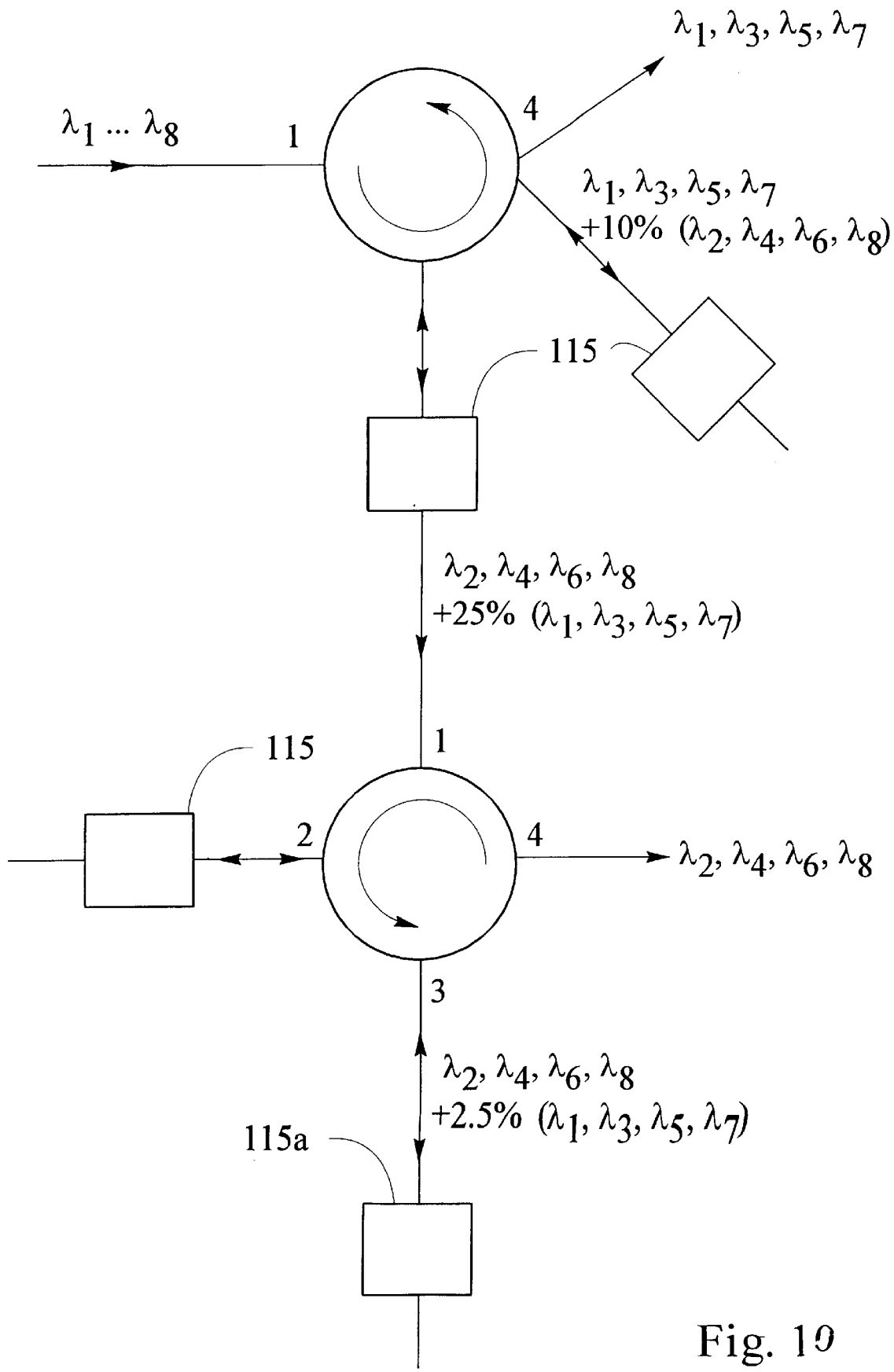
FIG. 10 is an optical circuit diagram of a system in accordance with the invention.

FIG. 10 is similar to FIG. 9, except that two reflections from each etalon 115 are required in order to achieve sufficient isolation. To meet this end, 4-port circulators are used instead of 3-port circulators.

Figure 11A:
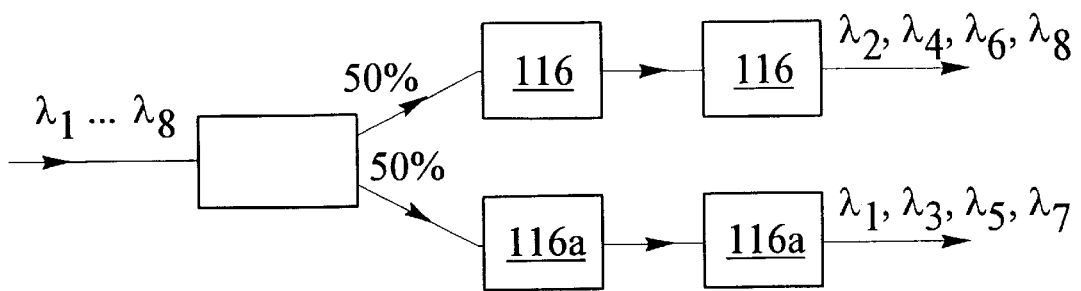
FIG. 11a is an optical circuit diagram of a system in accordance with the invention; and, FIG. 11b is an optical circuit diagram of a system in accordance with the invention.

FIG. 11a shows a sub-system using a 50/50 splitter to divide the input optical signal between two optical fibers. In the upper optical fiber, two etalons 116 transmit only light of wavelengths $\lambda 2$, $\lambda 4$, $\lambda 6$, and $\lambda 8$. In the lower fiber, two etalons 116a transmit only $\lambda 1$, $\lambda 3$, $\lambda 5$, and $\lambda 7$.

Figure 11B:
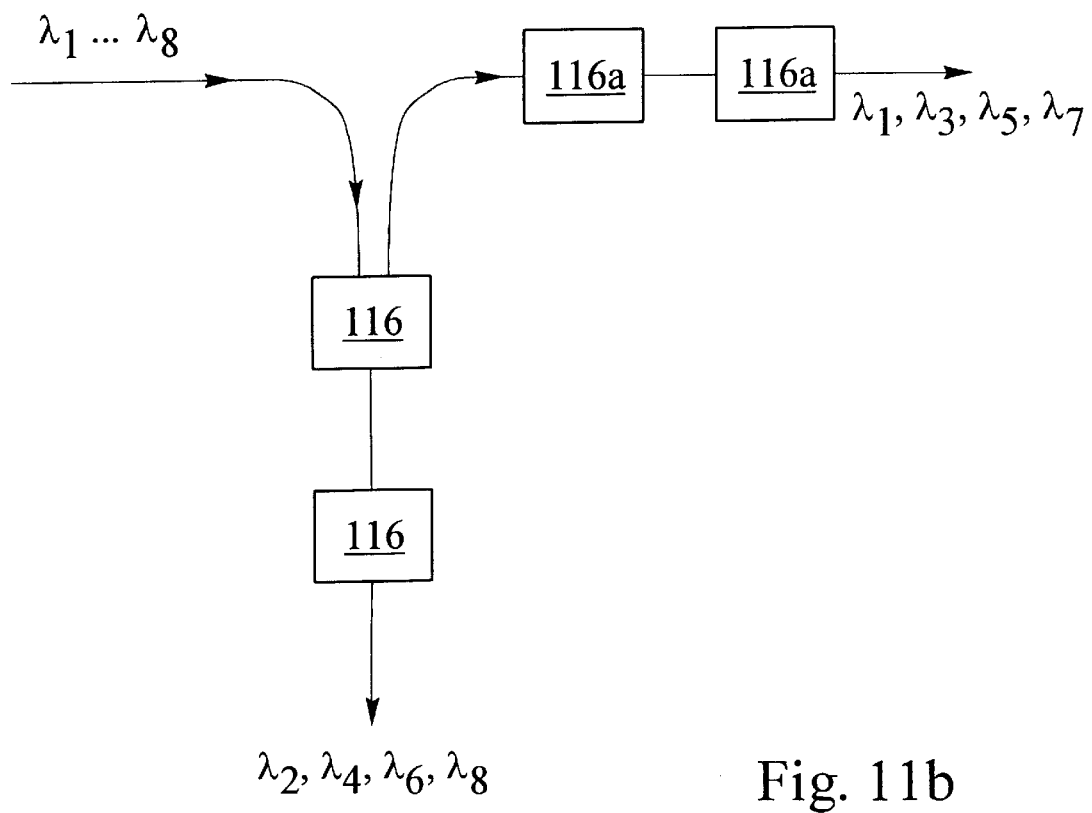

FIG. 11b shows an alternate configuration where the reflected signal from 116 is used to obtain $\lambda 1$, $\lambda 3$, $\lambda 5$, and $\lambda 7$ eliminating the 3 dB loss of the 50/50 splitter. As shown the reflected signal is captured in a separate optical fiber. Alternatively, an optical circulator may be used.

What is claimed is:

1. In a system wherein a plurality of contiguous data channels comprising a plurality of non-contiguous channels 1, ... n centered at wavelengths of light $\lambda 1$ ... $\lambda n$, respectively, multiplexed within a single optical signal, wherein the signal comprises at least a data channel spaced having a center wavelength spaced from a center wavelength of a subsequent or next data channel by a distance of "d" nanometers, and wherein $\lambda$ ... $<\lambda n$, and wherein n is an integer, a method of demultiplexing or de-interleaving data channels corresponding to at least some non-contiguous data channels from the single optical signal, comprising the steps of:

launching the single optical signal into an input port of an etalon, the etalon having a free spectral range (or period) corresponding to substantially "k2d", where "k" is an integer >0;

extracting only a portion of the launched optical signal in the form of a reflected signal captured from an output port on the etalon comprising only data channels spaced by a distance "k2d".

2. A method of demultiplexing channels of light as defined in claim 1, wherein k=1.

3. A method of demultiplexing channels of light as defined in claim 1, wherein the etalon is a multi-cavity etalon.

4. A method of demultiplexing channels of light as defined in claim 1 wherein the etalon has an output port at each of its end faces, and wherein an output response is captured at each port, the output responses captured at each port being shifted by d nanometers.

5. A method of demultiplexing channels of light as defined in claim 3, wherein the multi-cavity etalon has at least 3 cavities, and wherein the distance between cavity mirrors is substantially the same.

6. A method as defined in claim 1, wherein the input port and the output port are the same port.

7. In a system wherein a plurality of contiguous data channels 1, 2, 3, ... n centered at wavelengths of light $\lambda 1$, $\lambda 2$, $\lambda 3$, ... $\lambda n$, respectively, multiplexed within a single optical signal, wherein a center wavelength corresponding to at least a data channel within the signal is spaced from a center wavelength of a subsequent or next channel by a distance of "d" nanometers, and wherein $\lambda 1 < \lambda 2 < \lambda 3$, ... $<\lambda n$, and wherein n is an integer, a method of de-interleaving data channels of light corresponding to at least channels 1 and 3 from the single optical signal, comprising the steps of:

launching the single optical signal into an input port of an etalon, the etalon having a free spectral range (or period) corresponding to "2d";

extracting a portion of the launched optical signal in the form of a reflected signal captured from a port of the etalon comprising at least channels 1 and 3, spaced by a distance "2d" without capturing light corresponding to channel 2 from the same port of the etalon.

8. A method as defined in claim 7, further comprising the step of extracting a portion of the launched optical signal in the form of a transmitted signal captured from a another port at another side of the etalon comprising at least two second extracted channels including channel 2, said channels spaced by a distance "2d", wherein the at least two second channels are separated by a distance "d" from the two first extracted channels.

9. A method as defined in claim 8 wherein the distance "d" is substantially equal to 0.8 nanometers.

10. The method as defined in claim 9, wherein the etalon, the etalon having a free spectral range (or period) corresponding to "2d", is a multi-cavity etalon.

11. An etalon for use in demultiplexing or multiplexing data channels in an optical system, the data channels being contiguous data channels 1, 2, 3, ... n centered at wavelengths of light $\lambda 1$, $\lambda 2$, $\lambda 3$, ... $\lambda n$, respectively, multiplexed within a single optical signal, wherein at least some data channels within the signal have a center wavelength spaced from a center wavelength of a subsequent or next data channel by a distance of "d" nanometers, and wherein $\lambda 1 < \lambda 2 < \lambda 3$, ... $<\lambda n$, and wherein n is an integer, the etalon being a multi-cavity etalon having a free spectral range (or period) corresponding to "2d", the etalon having an input port for launching the signal comprising the plurality of data channels, and the etalon having coupling means optically coupled with the input port, said coupling means for providing the signal to the etalon, and having port for receiving a portion of the signal reflected from the multi-cavity first etalon.

12. A system as defined in claim 11, wherein in the coupling means is an optical circulator.

13. A system as defined in claim 11 further comprising a second multi-cavity etalon, having a free spectral range (or period) corresponding to "2d", and having a response that is substantially the same as that of the multi-cavity first etalon however shifted by 'd' nanometers.

14. A system as defined in claim 13, wherein the first etalon and the second etalon are optically coupled.

15. A system as defined in claim 14, wherein the first etalon is provided to substantially transmit or reflect a first group of wavelengths, and wherein the second etalon is provided to transmit or reflect a second group of wavelengths.

16. A system as defined in claim 11, further comprising additional different filter means for further demultiplexing the at least two signals.

17. In a system wherein a plurality of contiguous data channels 1, 2, 3, . . . n centered at wavelengths of light $\lambda 1$, $\lambda 2$, $\lambda 3$, . . . $\lambda n$, respectively, are multiplexed within a single optical signal, wherein at least a data channel within the signal has a center wavelength is spaced from a center wavelength of a subsequent or next data channel by a distance of "d" nanometers, and wherein $\lambda 1 < \lambda 2 < \lambda 3$, . . . $< \lambda n$, and wherein n is an integer, a method of de-interleaving data channels corresponding to at least data channels 1 and 3 from the single optical signal, comprising the steps of:

launching the single optical signal into an input port of an etalon, the etalon having a free spectral range (or period) corresponding to "2d";

extracting only a portion of the launched optical signal in the form of a reflected signal captured from an input port side of the etalon comprising at least two first extracted data channels, spaced by a distance "2d".

18. In a system having a plurality of contiguous data channels 1, 2, 3, . . . n centered at wavelengths of light $\lambda 1$, $\lambda 2$, $\lambda 3$, . . . $\lambda n$, respectively, the data channels being on two separate waveguides such that data channels corresponding to wavelengths $\lambda 1$, $\lambda 3$, are on a first optical waveguide, and data channels corresponding to wavelengths $\lambda 2$, $\lambda 4$ are on a second optical waveguide, wherein at least a data channel has a center wavelength is spaced from a center wavelength of a subsequent or next sequential data channel by a distance of "d" nanometers, and wherein $\lambda 1 < \lambda 2 < \lambda 3$, . . . $< \lambda n$, and wherein n is an integer, a method of interleaving data channels corresponding to at least data channels 1, 2, 3 and 4 into a single optical signal, comprising the steps of:

launching at least light having wavelengths $\lambda 1$, $\lambda 3$ corresponding to data channels 1 and 3 into a first port on one side of an etalon by optically coupling the first waveguide with the first port, the etalon having a free spectral range (or period) corresponding to "2d";

launching at least light having wavelengths $\lambda 2$, $\lambda 4$ corresponding to at least data channels 2 and 4 into a second port on an opposite side of an etalon from the first port by optically coupling the second waveguide with the second port; and, extracting a composite optical signal from a port on one of the sides of the etalon, the composite optical signal comprising wavelengths of light corresponding to data channels 1, 2, 3, and 4.

* * * * *